S. C. COBB.
Harrow.
No. 224,273. Patented Feb. 10, 1880.
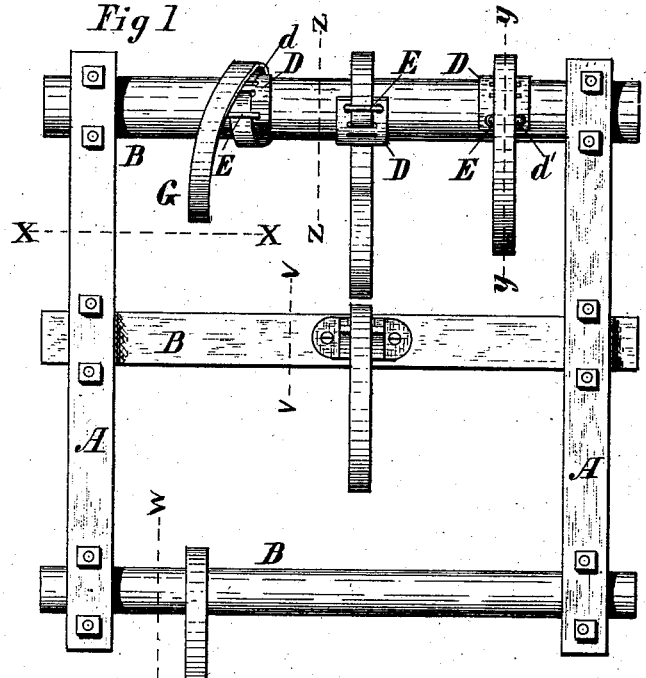
Fig 1
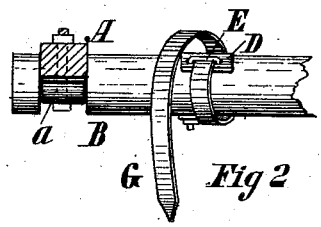
Fig 2
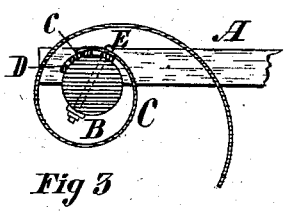
Fig 3
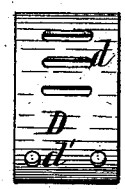
Fig 7
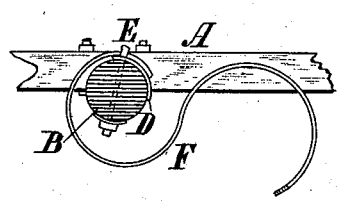
Fig 4
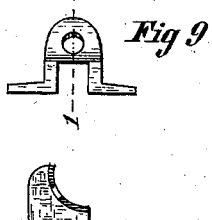
Fig 9
Fig 10
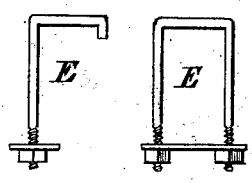
Fig 8
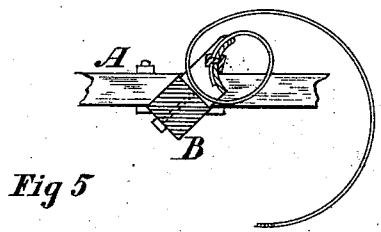
Fig 5
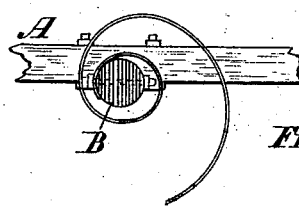
Fig 6
Witnesses
W. C. Corlies
Jno. C. MacGregor
INVENTOR
Samuel C Cobb
By Coburn & Thacher
Attorneys

UNITED STATES PATENT OFFICE.

SAMUEL C. COBB, OF JANESVILLE, WISCONSIN, ASSIGNOR TO JAMES B. CROSBY, OF SAME PLACE.

HARROW.

SPECIFICATION forming part of Letters Patent No. 224,273, dated February 10, 1880.

Application filed December 21, 1878.

*To all whom it may concern:*

Be it known that I, SAMUEL C. COBB, of Janesville, in the county of Rock and State of Wisconsin, have invented a new and useful Improvement in Harrows, which is fully described in the following specification, reference being had to the accompanying drawings, in which—

Figure 1 represents a plan view of a harrow containing my improvements; Fig. 2, a detail section taken on the line $x$ $x$, Fig. 1; Fig. 3, a vertical section taken on the line $y$ $y$, Fig. 1; Fig. 4, a vertical section taken on the line $z$ $z$, Fig. 1; Fig. 5, a similar section taken on the line $v$ $v$, Fig. 1; Fig. 6, a similar section taken on the line $w$ $w$, Fig. 1; Fig. 7, a plan view, on an enlarged scale, of one of the tooth-fastening plates; Fig. 8, views, on an enlarged scale, of the fastening hooks or staples; and Figs. 9 and 10, detail views of a toothed bracket.

My invention relates to that class of harrows in which elastic teeth are employed, and its object is to provide for the adjustment of the teeth either singly or together.
The invention consists of pivoted tooth-bars, in combination with elastic teeth attached to the bars by devices which permit them to be adjusted thereon, and which secure them rigidly in any adjusted position, whereby the teeth may be adjusted either independently on the bars or in a series by turning the bars themselves.

It also consists in specific devices for adjustably attaching the teeth to the bars, all of which will be hereinafter fully described, and distinctly pointed out in the claims.

In the drawings, A represents the side pieces of the harrow-frame, and B the tooth-bars, which, in this instance, are attached to the side bars so as to be turned or rotated. This is accomplished by cutting a journal on the bars and providing a seat or bearing therefor in the lower side of the beams A, and securing the tooth-bars in place by suitable bearing-straps $a$ and bolts fastening them to the beams, as shown in Fig. 2 of the drawings.

It is evident that when the tooth-bars are fastened to the sides in this way they may be turned in either direction in their bearings, thereby raising and lowering simultaneously all the teeth attached to one bar, for the purpose of adjusting the height and pitch of the points of the teeth.

This particular mode of attaching the tooth-bars to the sides is not essential, as any means of hinging or pivoting them together so that the tooth-bars may be rocked will answer the purpose.

The tooth-bars may be held in any adjusted position by any means suitable for this purpose, and, perhaps, friction alone may be sufficient. The bars may also be provided with connecting devices, by means of which they may all be adjusted at the same time, and by the movement of a single lever or other suitable device.

In Figs. 5 and 6 teeth are shown attached rigidly to the bars, in the former figure being fastened to a bracket, which, in turn, is secured to the bar, and in the latter figure being coiled around the bar itself and fastened directly thereto by a bolt. It is desirable, however, for some reasons to have the teeth attached to the bars by devices which will permit their adjustment thereon, so that any tooth may be raised and lowered independently of the others and without moving the bar. I have shown in the drawings one method of accomplishing this, though I do not limit my invention to this or any other particular device.

In Fig. 1 the teeth are shown attached to the front bar by coiling the upper end around the bar and fastening to a plate. This construction is also illustrated by Figs. 2 and 3 of the drawings, in which the upper end of the tooth C is bent around the bar, and the extremity at this end of the tooth bent in at right angles to form a hook, $c$. A plate, D, is fitted to the bar, in this instance curved, and provided with a series of transverse slots, $d$, and with one or more holes, $d'$, at one end. The hook or projection $c$ is adapted to enter one of the slots $d$, and a staple, E, is placed over the tooth and passes through the holes $d'$ in the plate and the bar, being secured by nuts and washers on the opposite ends.

The staple may have either one or two legs, as shown in Fig. 8 of the drawings, and it is evident that when fastened in place as described it will firmly secure the teeth and the plates to the bar.

Whenever it is desired to adjust a tooth it is only necessary to loosen the nuts sufficiently to permit the end of the tooth to be raised out of the slot in which it is held, when the tooth may be turned in either direction around the bar and the end placed in another slot, when the fastening is again secured. Thus the lower end of the tooth may be raised or lowered and its pitch changed, as desired. The same result may be accomplished, however, by employing some other attaching device which will permit the tooth to be adjusted on the bar.

In Fig. 4 of the drawings a tooth, F, is shown attached to the bar in the manner above described, but with a double bend, so as to give the tooth an S form and bring the coil at the bar underneath instead of above the latter.

In Fig. 1 of the drawings I have also shown a tooth, G, at one end of the front bar, the body of which is bent to one side, so that the point of the tooth will travel in a line to one side of the point of attachment to the bar. This construction is convenient for the purpose of arranging the track of the teeth, for they may be caused to track one after the other, or alternately, as may be desired, even though it may be inconvenient to arrange the bar attachments in the same order. This mode of bending the tooth is, of course, not confined to any particular attachment.

In the drawings only flat teeth are shown, all of them being made from elastic metallic strips or plates; but my main improvements are not limited to this kind of teeth, for round or square teeth may be used with the adjustable bars equally as well, and, like the flat teeth, attached thereto in a fixed or adjustable position.

I am aware of the patents of A. Hochstein, dated July 14, 1868, and L. A. Paddock, dated April 22, 1872, and I do not claim the inventions therein described and shown.

Having thus described my invention, what I claim, and desire to secure by Letters Patent, is—

1. In a spring-tooth harrow, the tooth-bars B, hinged or pivoted to the frame so as to be adjustable, in combination with elastic teeth attached to the bars by devices which permit them to be adjusted thereon and which secure them rigidly in any position to which they may be adjusted, whereby the teeth may be either adjusted independently on their respective bars or in a series by adjusting said bars themselves, substantially as described.

2. The tooth-bars B, in combination with the curved elastic tooth C, provided with a hook, $c$, at its upper end, the plate D, having transverse slots $d$, and a fastening hook or staple, E, substantially as described.

SAMUEL C. COBB.

Witnesses:
L. L. ROBINSON,
W. A. WEBSTER.